United States Patent [19]

Stievenart et al.

[11] 4,348,019
[45] Sep. 7, 1982

[54] METHOD AND DEVICE FOR SEPARATING A SHEET FROM A STACK OF SHEETS

[75] Inventors: Emile F. Stievenart, Hoboken; Hendrik S. Plessers, Wychmaal; Julianus J. Hellemans, Kontich, all of Belgium

[73] Assignee: Agfa-Gevaert N.V., Mortsel, Belgium

[21] Appl. No.: 134,553

[22] Filed: Mar. 27, 1980

[30] Foreign Application Priority Data

Mar. 30, 1979 [GB] United Kingdom ................ 7911119

[51] Int. Cl.³ .......................... B65H 3/06; B65H 3/50
[52] U.S. Cl. ...................................... 271/10; 221/236; 221/251; 271/110; 271/122; 271/149; 414/330
[58] Field of Search ............... 271/122, 121, 124, 125, 271/123, 167, 169, 18, 110, 111, 37, 10, 118, 30 A, 149, 150, 166, 34, 35; 221/251, 236; 250/468; 414/330, 123, 129, 127

[56] References Cited

U.S. PATENT DOCUMENTS

| | | | |
|---|---|---|---|
| 749,986 | 1/1904 | Dick | 271/122 |
| 3,086,772 | 4/1963 | Vogel | 271/166 X |
| 3,411,768 | 11/1968 | Gatti | 271/10 |
| 3,545,742 | 12/1970 | Muller et al. | 271/122 X |
| 3,572,690 | 3/1971 | Lillie | 271/166 X |
| 3,857,559 | 12/1974 | McInerny | 271/122 |
| 3,937,455 | 2/1976 | Hauser | 271/122 X |

Primary Examiner—Bruce H. Stoner, Jr.
Attorney, Agent, or Firm—William J. Daniel

[57] ABSTRACT

Single sheets are separated from a stack of sheets arranged in a housing having one open end in which at least one pair of separating rollers is disposed with the lower end of the stack resting in the nip thereof. One roller of each pair has a surface with a greater coefficient of friction relative to the sheet surface than that of the other roller and is rotated in a direction relative to the stack opposite to the other roller so that an outermost sheet is caused to slide from the remainder of the stack by frictional engagement of the one roller while the stack remainder is held from the oppositely rotating roller. Separation is greatly facilitated by the provision of hooks which support the lower edge of the remainder of the stack during separation and positively assist withdrawal of the stack remainder.

17 Claims, 9 Drawing Figures

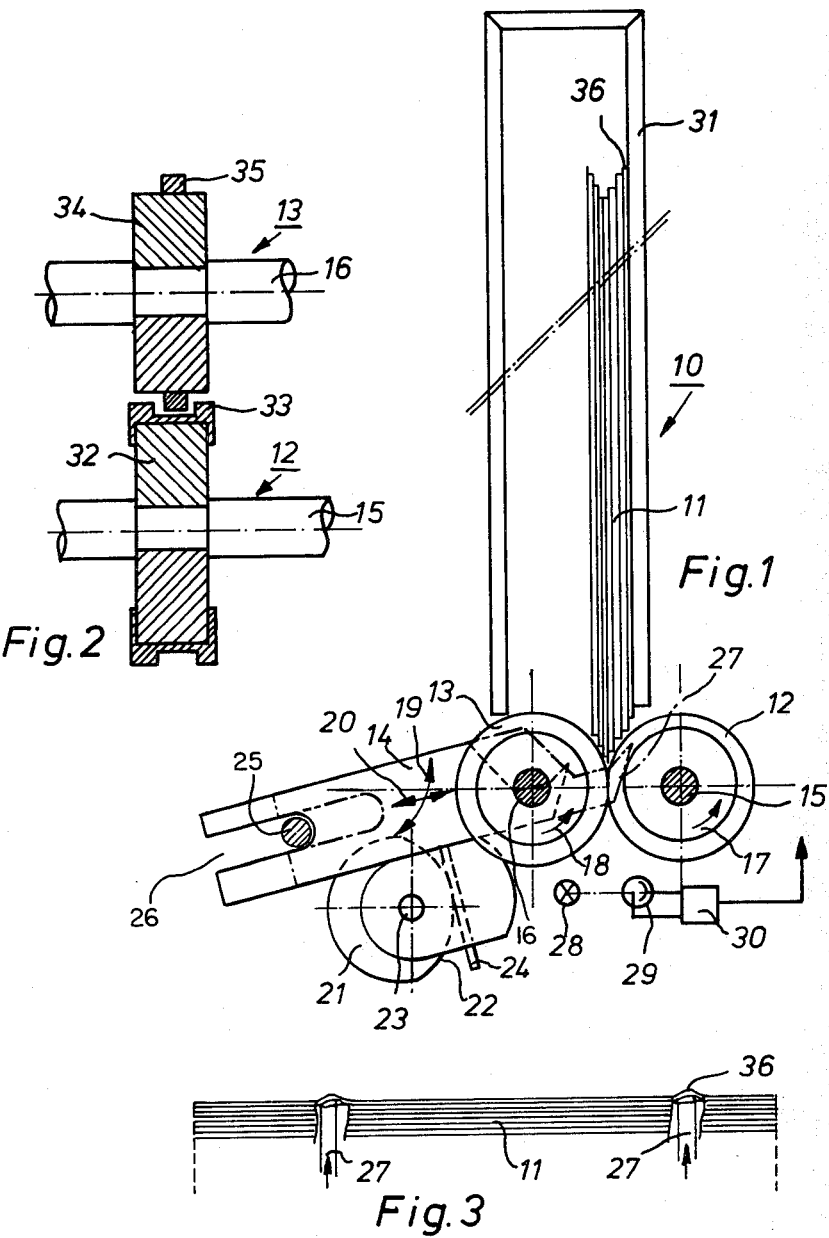

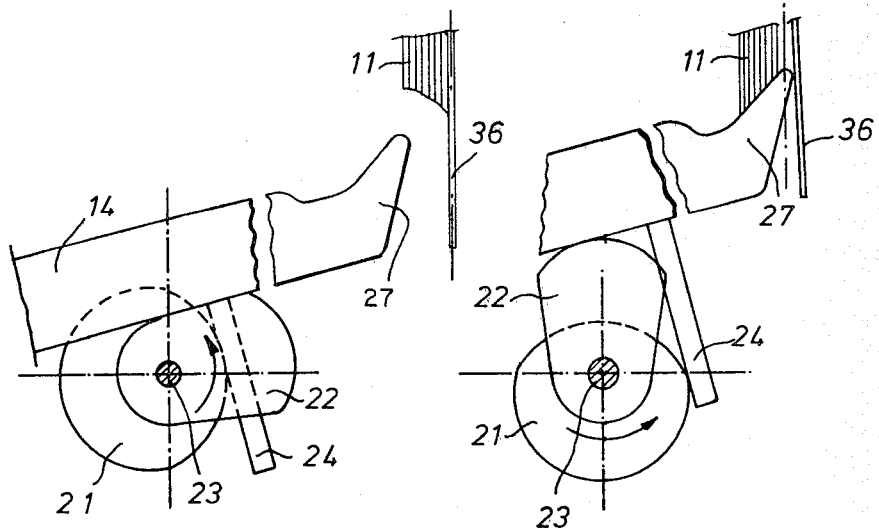
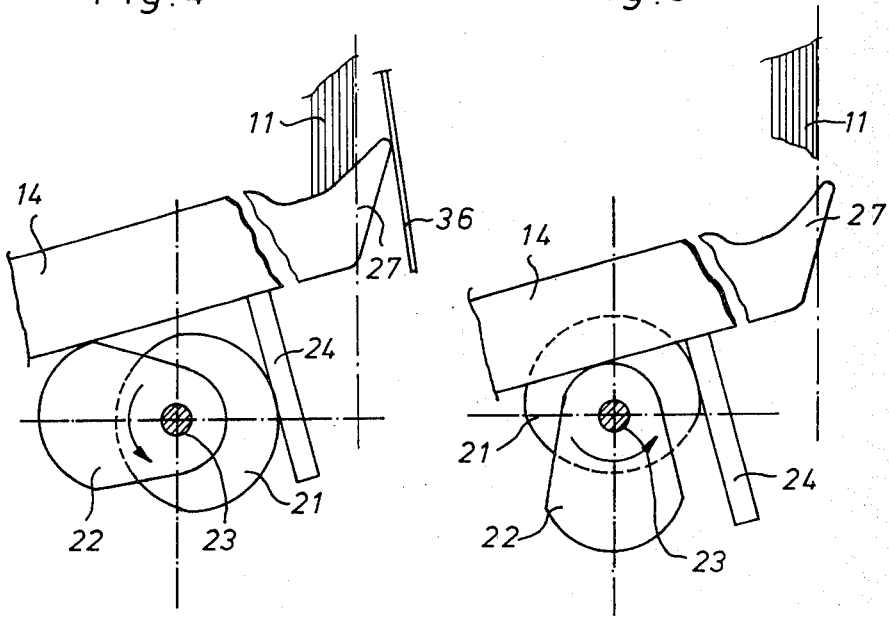

METHOD AND DEVICE FOR SEPARATING A SHEET FROM A STACK OF SHEETS

FIELD OF INVENTION

This invention is concerned with sheet dispensers and more particularly with a sheet dispenser for separating and dispensing the uppermost or lowermost sheet of a stack of sheets. The invention also aims at providing a new method for dispensing a sheet.

A particular field of application of the apparatus and method of the invention lies in providing an apparatus and method by means of which sheets of non-uniform format or sheets of varying surface characteristics may be dispensed one by one from a stack of such sheets.

BACKGROUND OF THE INVENTION

In the following description the dispensing of exposed or non-exposed radiographic film sheets will be considered as an example.

The apparatus and method of the invention are advantageously used in so-called intermediary unloading devices as used in daylight radiographic systems although their use is not restricted thereto. So, they may also be used as original feeders in photocopying machines or form part of a radiographic daylight loading system enabling a substantial simplification of such systems when compared with present-day installations.

The present-day intermediary unloaders are of the type in which a sheet or sheets of radiographic film when leaving a radiographic cassette is sandwiched between the adjacent convolutions of a web wound upon a core during the winding-up cycle. Dispensing of the sheets occurs when the core is rotated in reverse direction. It will be clear that, in so doing, the sheet which was first unloaded is dispensed the last, and vice versa.

The daylight loading devices used to-day are rather voluminous in that a plurality of loading modules have to be placed one above the other together with the module incorporating the voltage supplies and logic circuitry.

Further daylight loading apparatus are marketed which operate fully mechanically and which may be suspended from a wall. The mechanical nature of such devices, especially their film selecting mechanism, requires the use of so-called notched films which in aspect differ from the normal radiographic films to which the medical staffs are generally accustomed.

OBJECT OF THE INVENTION

It is therefore an object of the invention to provide a method and apparatus for dispensing sheetlike materials which do not show the disadvantage of prior art systems.

SUMMARY OF THE INVENTION

A method for separating a sheet from a stack of sheets, comprising the steps of:
supporting a stack of sheets with one of its edges against the surface of at least two pairs of traction surfaces forming a nip, the first one of each pair of traction surfaces having a coefficient of friction relative to one surface of the sheet to be separated that is greater than the coefficient of friction of the second one of each pair of traction surfaces relative to the other surface of the sheet to be separated,
imparting to each pair of traction surfaces a movement so that said first one advances in the direction of feed of the sheet to be separated, whereas the second one advances in the opposite direction thereby causing the stack of sheets to be displaced so that the outermost sheet which is supported by the first traction surfaces is directed into said nip and fed over a predetermined distance therethrough, and with the help of lifting means, preferably in the shape of hooks, lifting the said one of the edges of said stack away from said traction surfaces so that the remainder of the sheets still constituting the stack are bodily separated from the sheet to be separated.

In a preferred embodiment the traction surfaces are in the form of rotating rollers having their periphery made of or provided with a layer or coating having the frictional properties referred to.

After the above separation of one sheet from the rest of the stack is carried out, the sense of rotation of the second one of each pair of rollers may be reversed so that the separated sheet is further driven in the direction of feeding.

Alternatively, once the initial separation of the sheet to be separated is carried out, the first and second rollers of each roller pair may be separated from each other so that the already separated sheet may drop down under the force of gravity. The latter case is of importance when the stack is mounted in vertical or almost vertical position.

Once the separated sheet is fed in its direction of dispensing a second transport roller pair may be provided in order to catch the leading edge of the sheet for further transporting same. If desired, the peripheral speed of the second set of rollers may be higher than the speed of the sheet to be dispensed, so that the second stage of the dispensing cycle (for example the loading of a radiographic film cassette) may be accomplished with a substantial gain of time.

The lifting movement of the hooks referred to may be such that the advancement of the hooks causes a pushing away or a small buckling deformation of the edge of the sheet to be dispensed, so that air is allowed to flow between the surface of the sheet to be separated and the surface of the succeeding one, in contact therewith so that the separation is greatly facilitated.

The method may be applied for dispensing originals in photocopying equipment, for dispensing either unexposed radiographic film sheets into a radiographic cassette or exposed radiographic films into a processing apparatus.

The invention also aims at providing:
A device for separating a sheet from a stack of sheets comprising:
at least two pairs of traction surfaces forming a nip and supporting one edge of said stack, the first one of each pair of traction surfaces having a coefficient of friction versus one surface of the sheet to be separated which is greater than the coefficient of friction of the second one of each pair of traction surfaces versus the other surface of the sheet to be separated,
means for moving each pair of traction surfaces in such a way that the first one of each pair advances in the direction of feed of the sheet to be separated whereas the second one of each pair of said traction surfaces advances in the opposite direction, thereby causing said stack of sheets to be displaced so that the outermost sheet which is supported by the first traction surface is directed into said nip and fed over a predetermined distance therethrough. In a preferred embodiment, the traction surfaces are in the form of rollers which on their periphery are provide with a layer having the frictional characteristics referred to, and lifting means, e.g. formed as hooks, for lifting the said one of the edges of said stack away from said traction surfaces so that the residual sheets which still constituted said stack are bodily separated from the sheet to be separated.

In order to further dispense the separated sheet, means may be provided for reversing the sense of rotation of the second roller of each roller pair after detection of the leading edge and while the residual sheets are still carried by the lifting means.

Alternatively, means may be provided for moving the rollers of each roller pair bodily away from each other so that the sheet to be dispensed may fall from between the nip of the first and second rollers. It will be clear that in the last situation referred to the stack must assume an inclined position so that use may be made of the force of gravity for further dispensing the sheet.

In a preferred embodiment the movement of the lifting means may be governed by a cam system which enables the lifting hooks to partly push away the leading edge of the separated sheet so that the further separation is greatly facilitated as air is permitted to flow between the surface of the sheet to be separated and the surface of the next sheet in the stack. The lifting means advantageously assume a hook-like shape. In so doing, the friction between the surfaces of adjacently positioned sheets is greatly reduced. This characteristic is of great importance when radiographic film sheets have to be dispensed.

Preferably, the first roller of each roller pair is of the crenelated type, i.e. peripherally grooved, whereas the second roller carries a projecting bead over its circumference so that both rollers can mate with each other.

The mechanism for separating and dispensing sheets one by one may be located in a light-tight housing so that the whole arrangement may serve as or may form part of a storage station for exposed or unexposed radiographic films in daylight radiographic systems. A device for unloading radiographic films under well-lit conditions and wherein use is made of the device according to the present invention is disclosed in our co-pending application Ser. No. 134,552 filed Mar. 27, 1980 by Agfa-Gevaert N.V. for "Device for unloading radiographic cassettes in daylight".

When the sheet after separation is further advanced by the rollers of the roller pair, supplementary transport rollers may be provided which rotate at a higher speed than the speed of feeding so that the further treatment of the dispensed sheet occurs at a substantially higher speed than the initial one.

BRIEF DESCRIPTION OF THE DRAWINGS

The scope and spirit of the invention will be better understood from a description of a preferred embodiment and with reference to the following figures in which:

FIG. 1 is a cross-sectional view of the device according to the invention, showing the device in its starting position with the stack of sheets placed generally vertically in the magazine and the starting retracted position of the stack lifting fingers indicated in solid lines and its projected position in broken lines, FIG. 2 illustrates the structure of the separating rollers, FIG. 3 shows the effect of the lifting hooks apart from supporting the stack, FIGS. 4 to 7 illustrate the positions taken by the hooks during the steps of dispensing a sheet, the stack lifting hooks in each figure being broken away lengthwise and the generally vertical plane of the outermost sheet of the stack indicated by a dot-dash line.

DETAILED DESCRIPTION OF PREFERRED EMBODIMENT

Figure 8:
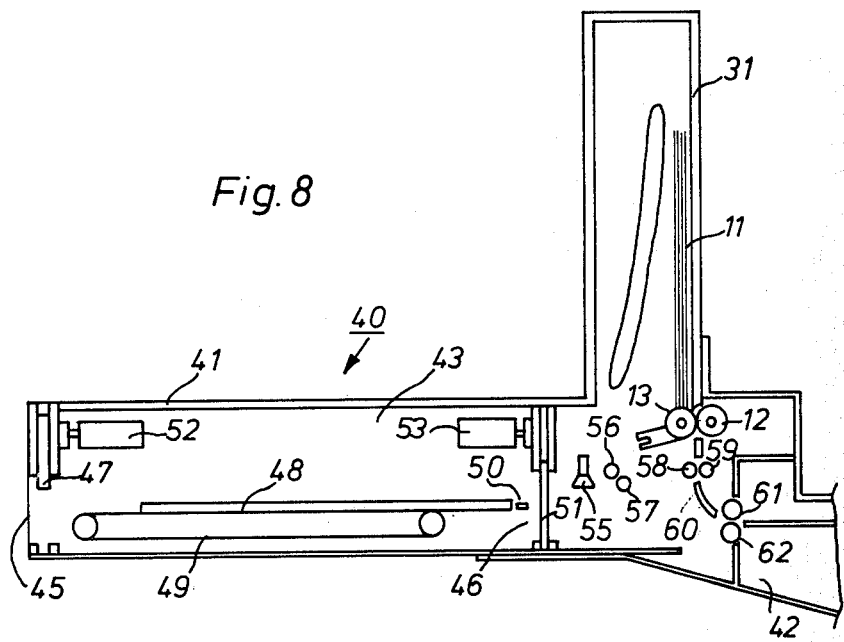
FIG. 8 shows a daylight radiographic unloader including the device of the invention.

As illustrated in FIG. 1 a device 10 for separating a sheet from a stack of sheets 11 comprises sets of pairs of separating rollers 12 and 13, and hooks 14. In order to be able to separate and dispense a minimum format of sheets constituting the stack 11 the sets of separating rollers 12 and 13 are axially spaced over a distance of say 6 cm. So it is possible to separate and dispense radiographic films of the 10×10 cm format. For separating films of larger sizes either more sets of rollers 12 and 13 may be provided or the roller pair may be separated over a larger distance. In order, however, to provide for a faultless separation of formats which are intermixed, the first solution is generally preferred.

The same reasoning is applicable to the lifting hooks 14, in that at least two of them are required for separating sheets with a minimum format, but that their number may be increased if necessary.

Rollers 12 and 13 are fixedly mounted on shafts 15 and 16 parallelly arranged with the lower edge of the stack 11.

Roller 12, rotating in a sense as indicated by arrow 17 has its surface contacting the bottom edge of the stack 11 made of or provided with a material which has a high coefficient of friction versus the surface of the sheet material in stack 11. In a preferred embodiment, this material is silicone rubber.

On the contrary, roller 13, rotating in the sense indicated by arrow 18, has a surface made of or provided with a material having the opposite characteristics.

Due to the rotation of rollers 12 and 13 in opposite directions relative to the stacks, the edge of the stack 11 resting on the roller periphery is displaced within the nip formed by the rollers which action continues until the outermost sheet 36 is in said nip. At that moment it is advanced therethrough due to the frictional relationship between its surfaces and the peripheral surface of the rollers 12 and 13.

In case radiographic films are to be dispensed, it is important to avoid excessive sliding friction between adjacently positioned sheets as such sliding would give rise to unwanted side-effects after development. Therefore, the separated sheet 36 is advanced over only 1 or 2 centimeters, and use is then made of supplementary separating elements in the form of a plurality of hooks 14 (at least two of them being provided).

The hooks 14 may undergo a composite motion according to the arrows 19 and 20. This motion is obtained by the action of cams 21 and 22 fitted to a shaft 23 and rotated via motor means (not shown). Cam 21 provides for the movement in the direction of arrow 20 by urging against a projection 24 fixedly secured to hooks 14. Simultaneously the hooks 14 are supported by a bar 25 located in a recess 26 at the extremity of hooks 14. Cam 22 delivers a lifting movement to the hooks 14. The resultant motion is that the bar 25 provides for a support during the displacement in the direction of arrow 20 and at the same time serves as center of rotation according to the direction 19.

Consequently the gripping portion 27 of hooks 14 executes an upwardly movement, capable of supporting the remaining sheets of the stack 11. Further details will be given hereinafter with reference to FIGS. 4 to 7.

Simultaneously with a bodily separation of the sheet 36 lying closest to roller 12 from the rest of the stack 11, the separated sheet 36 continues its travel through the nip of the roller pairs 12 and 13 until its leading edge is struck by the beam emitted by lamp 28 falling upon photocell 29. Via the amplifying stage 30 the absence of the radiation beam is transmitted to an electronic logic unit (not shown) controlling the dispensing of the already separated sheet.

It will be clear that in the case a radiographic film sheet or another light-sensitive material is dispensed the radiation emitted by lamp 28 must fall outside that portion of the light spectrum for which the concerned sheet is sensitive. Most preferably the lamp 28 is of the infrared-emitting type so that the light-sensitive material is not affected by the emitted radiation beam.

Dispensing of the separated sheet occurs through the intermediary of the signal of photocell 29 which either starts a mechanism reversing the sense of rotation of roller 13 or causes the mechanical separation of rollers 12 and 13.

In the first case, the separated sheet becomes positively driven, in the other case the sheet drops down under the influence of the force of gravity.

It will be clear that when the device of the invention is used as a dispenser for unexposed or exposed but not yet developed radiographic films a light-tight housing 31 shall surround the sheet storage compartment of the device.

In FIG. 2 the structure of the separating roller pairs 12 and 13 is shown more in detail.

Rollers 12 are fixedly mounted on shaft 15 whereas rollers 13 are fixedly mounted on shaft 16. Roller 12 consists of a core 32 made of metal or any other undeformable material which bears a sleeve 33 over its whole periphery. The sleeve 33 is made of silicone rubber or any other highly deformable material having a relatively high coefficient of friction relative the surface of the sheets which are to be dispensed. In order to promote the efficiency of the co-action with the roller 13, the sleeve 33 is crenelated, i.e. grooved, around the middle. Roller 13 may also comprise a core 34 onto which a ring 35 of a hard material having a low coefficient of friction relative to the surface of the sheet to be separated is provided. The outer limit of the ring 35 is slightly spaced from the bottom of the groove of sleeve 33 on roller 12 so that the feeding of the sheet 36 to be dispensed occurs without excessive binding of the latter, due the high deformability of the peripheral surface of roller 12.

In FIG. 3 is illustrated how the hooked end portions 27 of hooks 14, apart from supporting the residual sheets of the stack 11 facilitate the separation of the uppermost sheet 36. So it may be derived that said hook portions 27 project slightly beyond the outside surface of the sheet 36 to be dispensed (illustrated in an exaggerated way). As already a power portion of the latter has been displaced over some distance into the path of the hooks, that portion is pushed or buckled in rearward direction, so that in case the sheets should stick together, small cavities are formed between the concerned sheet and the one of the stack contacting it. As a consequence air is permitted to pass between the surfaces of succeeding sheets of the stack in this way facilitating their bodily separation thereby easily neutralizing partial vacuum areas such as might be present due to the intimate contact between the sheets. The separated sheet 36 then becomes pushed in rearward direction over its entire width (see FIGS. 4 to 7).

FIGS. 4 to 7 illustrate schematically how the first sheet 36 of the stack 11 is further dispensed into a device according to the invention.

FIG. 4 shows how the hooks 14 are positioned while still in rest position. At that moment the sheet 36 has advanced over some distance due to the action of the separating rollers 12, 13 (see FIG. 1). FIG. 5 illustrates the situation after the shaft 23 has performed a quarter of one revolution. The hooked end portions 27 slightly displaces outwardly the downwardly extending portion of sheet 36 (see also FIG. 3) which results in the fact that in the vertical plane of the hooks said portion assumes a position as illustrated in FIG. 5. In the vertical plane of the rollers (see preceding Figures), on the contrary, the sheet 36 remains caught in the nip formed by the latters. As a consequence, the sheet 36 assumes an undulated pattern in the horizontal plane defined by the nip of the roller pairs 12,13 and by the hook portions contacting the sheet 36. In so doing, air flows into the space between the sheet 36 and the next sheet of the stack, in this way promoting the separation between said sheet and said stack. The residual sheets forming the stack are supported by the hooks 14 and are lifted from the rollers 12,13 (not illustrated) causing the bodily separation to be initiated.

FIG. 6 illustrates the situation after a supplementary rotation over 90° of shaft 23. At that moment the hook portion 27 reaches the outermost point of its trajectory so that the complete separation of the sheet 36 from the stack 11 has been performed. Finally, in FIG. 7 is shown that the separated sheet 36 has disappeared by the fact that the separating rollers 12 and 13 of FIG. 1 are either both rotating in the direction of feeding or are separated from each other so that the sheet 36 has dropped down under the force of gravity. The cam 22 enables now the hooks 14 to return to their downmost position so that the stack 11 is no longer supported by said hooks 14 but is again resting on separating rollers 12, 13.

FIG. 8 shows an embodiment of a daylight unloader for radiographic film cassettes comprising a device of the invention. Such a daylight unloader is the object of our co-pending application Ser. No. 134,552 mentioned hereinbefore.

As may be derived from FIG. 8, an unloader 40 for radiographic cassettes comprises a housing 41 which may be light-tightly closed and connected to a radiographic processing apparatus 42, only a section thereof being shown.

The housing 41 consists of two main parts: a part 43 in which the radiographic cassette is positioned and unloaded, and a part 31 in which the radiographic film or films is or are temporarily stored prior to dispensing the film(s) into the processing apparatus 12.

Part 43 of housing 41 is built-up as a box shaped space which has an entrance opening 45 and an exit opening 46 which openings may be covered and/or uncovered by a so-called light trap.

The light trap 47 associated with the entrance opening 45 is normally in open position and is only closed during the unloading cycle so that the introduction of a radiographic cassette 48 via such opening 45 and its placing on endless belt 49 may be carried out when desired.

The introduction of the radiographic cassette 48, which event is detected by suitable detecting means, such as a small incandescent lamp and a photo-responsive switching device, (both not shown) causes the endless belt 49 to start moving in the direction of the arrow, thereby taking along the radiographic cassette 48.

After a small time lapse, the leading edge of the radiographic cassette 48 abuts against the contact arm of microswitch 50 causing the stopping of the endless belt 49, the covering of entrance opening 45 by light trap 47 and the consequent aligning, unlocking and opening of the radiographic cassette 48.

At the same time exit opening 46 is brought in its uncovered position by withdrawal of light trap 51. The closing of entrance opening 45 by light trap 47 occurs via the intermediary of electric motor 52 which by means known in the art imparts the downward movement to light trap 47. Analogously, the uncovering of exit opening 46 by light trap 51 is carried out by actuation of motor 53.

It will be clear that a small time-lapse has to be taken into consideration between the covering of entrance opening 45 and the uncovering of exit opening 46, as otherwise, ambient light would be allowed to penetrate into the part 43 of the device 40.

Indeed, in part 31 which serves as a storage magazine for exposed but non-processed radiographic films 11, the accidental exposure to ambient light conditions of the latters needs to be completely excluded. After the radiographic cassette 48 is correctly opened and the exit opening 46 is freed, a film holding device, such as a sucker cup 55, or a plurality of such sucker cups is brought into operative position, so that it can take hold of a small area (or areas) in close vicinity of the edge of the radiographic film. The film holding device is subjected to a cycle of movements, enabling a gradual lifting of the radiographic film so that the latter does not or only slightly undergoes friction on the bottom of the radiographic cassette 48. The leading edge of the radiographic film is then caught by transport roller pair 56, 57.

Transport roller pair 56, 57 rotates at high speed, so that a radiographic film is projected into storage part 31 against the stack of radiographic films which were already present in said part.

In order to correct any misalignment of the radiographic film, a supplementary guide member for the dispensed sheets may be provided in the storage part. The stack of stored radiographic films 11 is lying with its downmost edge upon hooks 14, equidistantly distributed along the edge of the stack 11 and placed at such a distance of each other that the smallest size of radiographic film is supported by at least two of such hooks 14. For the purpose of forwarding one film of the stack 11 towards processing machine 42, the dispensing mechanism consists mainly of a plurality of pairs of separating rollers 12, 13, which seize the leading edge of the radiographic film lying at the right side of the stack thereby retaining the residual films supported by the hooks 14. In so doing only one sheet is guided by roller pair 58, 59, and guide 60 towards the inlet roller pair 61, 62 of the processing machine 42.

The roller pair 56, 57 rotates at a speed which is substantially higher than the speed imposed to the radiographic film in the processing apparatus and may attain 250 mm/s, so that the unloading cycle of the unloader may be drastically increased when compared with prior art devices.

Once the unloading cycle has come to an end, that is to say, when the radiographic film has completely disappeared into the part 31, the light trap 51 at the exit opening 46 is brought again in screening position, whereas light trap 47 is withdrawn from inlet opening 45. The mechanism for opening the radiographic cassette 48 is energized so that the radiographic cassette is closed but not relocked. Subsequently, the endless belt 49 starts moving in the opposite direction and stops when the radiographic cassette 48 partly projects out of the entrance opening 45, so that it can be taken by the operator. The fact that no relocking has occurred makes the cassette ready for being put in a so-called daylight loader in order to receive a fresh radiographic film.

The unloader according to the invention is supplementarily equipped with control circuits to increase its convenience still more. So, for example, when the radiographic cassette 48 is put into the apparatus in a wrong manner (upside down, with locking mechanism at the reverse side of the apparatus interior, etc.) an acoustic alarm may be energized, meanwhile the cassette is transported out of the apparatus. The detection of any incorrect positioning may be carried out very quickly and the period elapsing between the introduction of an incorrectly positioned cassette and its withdrawal amounts to three seconds only.

Another control circuit may be provided in order to bring the radiographic cassette out of the apparatus in case the cassette should be empty. In that case, the sucker cups 55 would adhere to the intensifying screen provided in the bottom-frame of the radiographic cassette 48 and would remain sticking thereto. In order to obviate this effect, use may be had of a vacuum sensitive switch mounted in the vacuum line(s) leading to the sucker cups 55 so that the vacuum can be cut-off when the latter has reached a certain minimum value.

The unloading device 40 is preferably controlled by a microprocessor which enables to build up an adequate logic in order to provide for a highly reliable and ergonomic operation of the device.

Dependent on the place where the unloading device according to the invention will be mounted, the housing 41 may be manufactured from an X-ray impervious material or from a light material when the radiographic processor is located far enough from the department where radiographs are taken.

The storage part 31 may be made detachable from the rest of the unloader 40, so that it may be used as an intermediate storage magazine, whereas the possibility is given thereby for removing it from the processing apparatus should anything go wrong in the subsequent processing cycle. The latter characteristic may be combined with the provision of a mechanism making the rollers 12,13,58 and 59 to rotate in a sense as to reverse the direction of feed of the radiographic film in the course of being dispensed so that the latter is again collected in the storage part 31 of the unloader 40, before the storage part is removed.

Figure 9:
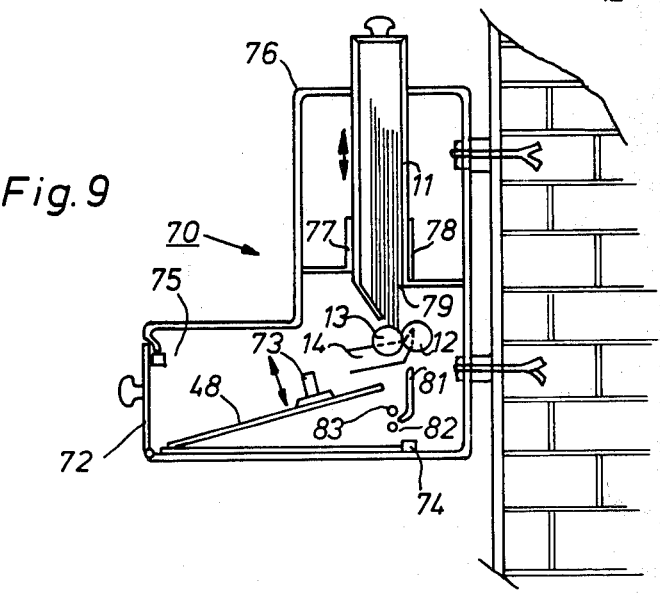
FIG. 9 shows how a device according to the invention may be incorporated in a daylight system for loading radiographic cassettes.

In FIG. 9 is illustrated how a device according to the invention may be incorporated in a device for loading radiographic cassettes in daylight conditions.

Due to the fact that the sheet dispensing device according to the invention is not complicated in structure and of moderate dimensions it may easily be mounted against a wall.

As may be seen a daylight loader 70 for radiographic cassettes 48 is attached to a wall by means of suitable attaching means. The daylight loader comprises a housing 71 the interior of which being light-tightly screened from ambient light by means of a door 72 via which the radiographic cassette 48 may be introduced into the device.

The radiographic cassette 48 may be introduced into the housing 71 either in unlocked or in locked condition. In the second case a supplementary unlocking mechanism must be provided. As such locking mechanism forms no part of the invention it has not been represented. After the radiographic cassette 48 is unlocked, a suitable opening mechanism, here represented in a simple way as a sucker-cup 73, takes hold of one of the cassette frames to hinge the cassette open. Suitable mechanisms for controlling the sequential movement of the sucker-cup 73 or any other cassette opening device are sufficiently known from prior art publications and therefore need no further description.

As illustrated in FIG. 9, the radiographic cassette 48 is introduced in a horizontal direction until it abuts against an abutment and aligning member 74. After relocking the access door 72 a microswitch 75 is tripped which starts the automatic loading cycle.

At the top-side of the housing 71 an opening is provided via which a magazine 76 containing a plurality of unexposed radiographic films 11 may be introduced into the housing. In order to provide for a correct registering of the magazine 76 guides 77, 78 are provided which guide the magazine until it abuts against a stop 79.

The magazine 76 is provided with a pivotable screening member 80 which automatically collapses when the magazine 76 has reached its limit point, thereby providing a downwardly sloping plane which causes the radiographic films 11 to slide out of the magazine 76 and to be positioned on separating rollers 12, 13.

After selection according to the method of the invention, a radiographic film is then fed towards the opened cassette 48 via guide 81 and with the help of transporting rollers 82, 83.

Once the loading cycle has come to an end, the cover of the radiographic cassette 48 is released and the latter re-locked so that it may be taken out of the housing. Relocking may be carried out with the help of a separate mechanism or with the help of the inertia of the falling cover which suffices to overcome the biasing forces of the locks.

Instead of positioning the radiographic cassette 48 with one of its members in horizontal or nearly horizontal position, it may also be envisaged to position an open cassette supported on only its side and to load it by feeding a radiographic film in vertical direction.

The use of a sheet separating/dispensing device according to the invention is not restricted to the feeding of radiographic film materials into a cassette or for unloading such cassettes after exposure.

Also in the document copying sector it may be favourably used as a feeder for originals or sheets of copy paper. It falls within the scope of the invention to replace the components of the device by their electrical or mechanical analogues. So the first roller of each separating roller pair may be replaced by an endless belt, the surface of which having the same frictional characteristics.

We claim:

1. A method for separating a sheet from a stack of sheets, comprising the steps of:
   supporting a generally vertically oriented stack of sheets with the lower edges of the sheets therein abutting against the surface of at least two pairs of rotary traction surfaces forming a nip, a first one of each pair of traction surfaces having a coefficient of friction relative to one surface of the sheet to be separated that is greater than the coefficient of friction of the second one of each pair of traction surfaces relative to the other surface of the sheet to be separated,
   imparting to each such pair of traction surfaces rotary movements so that said first one advances in the direction of feed of the sheet to be separated, whereas the second one advances in the opposite direction thereby causing the stack of sheets to be displaced to bring the lower edge of the outermost sheet which is supported by said first traction surface into said nip and advanced thereby over a predetermined distance therethrough,
   after a predetermined length of said outermost sheet has passed beyond said nip, engaging the remainder of the sheets in said stack and lifting the same bodily upwardly away from said traction surfaces so that the remaining sheets in the stack are bodily separated from the sheet to be separated,
   advancing the thus-separated sheet through and away from said pair of traction surfaces, and
   returning the remaining sheets of the stack into lower edgewise abutment with said traction surfaces.

2. A method according to claim 1, in which said traction surfaces are in the form of pairs of rollers having mating peripheral grooves and beads.

3. A method according to claim 1, which in addition comprises the step of reversing the direction of rotary movement of the second one of each pair of rotary traction surfaces after the outermost sheet has been separated from the stack so that the separated sheet is further driven in the direction of feed.

4. A method according to claim 1, which in addition comprises the step of bodily separating the first and second ones of each traction surface pair so that the already separated sheet falls down under the force of gravity.

5. A method according to claim 1, which in addition comprises the step of engaging the leading edge of the separated sheet by supplementary transport means.

6. A method according to claim 5, wherein the transport speed of said supplementary transport means is substantially higher than the speed at which the said sheet is separated from said stack.

7. A method according to claim 1, in which the projecting lower portion of the outermost sheet is displaced laterally away from the stack before the remainder of the stack is lifted bodily, thereby allowing air to flow between the surface of the sheet to be separated and the surface of the succeeding sheet of said stack for facilitating the separation.

8. A device for separating a sheet from a stack of film sheets comprising:

at least two pairs of rotary traction surfaces forming a nip and supporting one edge of said stack, the first one of each pair of traction surfaces having a coefficient of friction relative to one surface of the sheet to be separated which is greater than the coefficient of friction of the second one of each pair of traction surfaces relative to the other surface of the sheet to be separated;

means for rotating said each pair of traction surfaces in directions such that the first one of each pair advances in the direction of feed of the sheet to be separated, whereas the second one of each pair of said traction surfaces advances in the opposite direction, thereby causing said stack of sheets to be displaced so that the lower edge of the outermost sheet which is supported by said first traction surface is directed into said nip and advanced thereby a predetermined distance therethrough; and lifting means operable after the predetermined length of said outermost sheet has passed through said nip to engage the remainder of the stack and lift the same bodily so that the remaining sheets constituting said stack are bodily separated from the sheet to be separated and after separation of the latter to return the stack into edgewise abutting contact with said traction surfaces.

9. A device according to claim 8 in which said traction surfaces are in the form of pairs of axially spaced rollers.

10. A device according to claim 9, in which said first one of each pair of rollers has a peripheral groove and said second roller of each pair of rollers carries a projecting bead on its periphery so that the first and second rollers at least partly mate with each other.

11. A device according to claim 9, in which said first one of each pair of rollers has a surface made of silicone rubber.

12. A device according to claim 8, including means to detect the leading edge of said sheet to be separated after the latter is advanced over said predetermined distance.

13. A device according to claim 12, in which said means cause the reversal of the rotation direction of said second one of each pair of traction surfaces after detection of said leading edge.

14. A device according to claim 8, in which said predetermined distance is not more than 2 cm.

15. A device according to claim 8, which in addition comprises means for further dispensing the separated sheet.

16. A device according to claim 15, in which said means cause the bodily separation of said first and second ones of each pair of traction surfaces.

17. A device according to claim 8, in which said lifting means have a hook-like shape.

* * * * *